C. STOLL.
REFRIGERATING BUILDINGS.

No. 184,189. Patented Nov. 7, 1876.

Witnesses:
Otto Hufeland
Hugo Brueggemann

Inventor.
Charles Stoll
by
Van Santvoord & Hauff
his attorneys.

UNITED STATES PATENT OFFICE.

CHARLES STOLL, OF BROOKLYN, NEW YORK.

IMPROVEMENT IN REFRIGERATING-BUILDINGS.

Specification forming part of Letters Patent No. 184,189, dated November 7, 1876; application filed September 26, 1876.

*To all whom it may concern:*

Be it known that I, CHARLES STOLL, of Brooklyn, in the county of Kings and State of New York, have invented a new and useful Improvement in Refrigerator-Buildings, which improvement is fully set forth in the following specification, reference being had to the accompanying drawing, in which—

Figure 1:
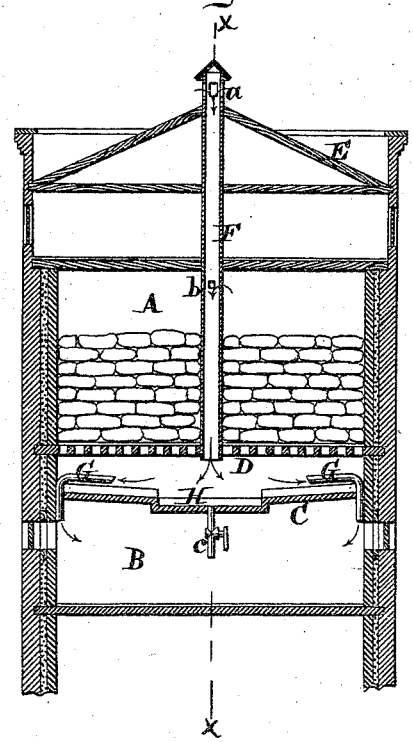
Figure 2:
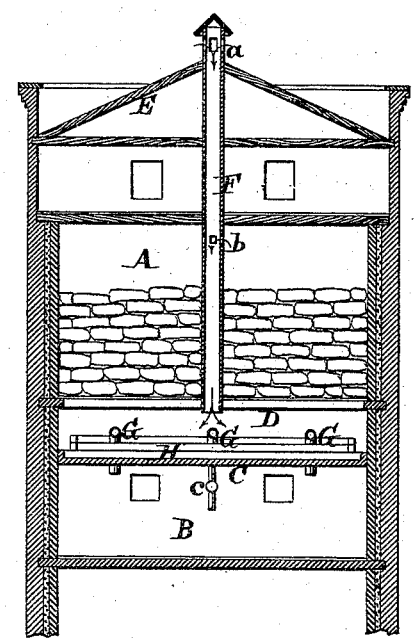

Figure 1 represents a vertical central section of a building constructed according to my invention. Fig. 2 is a like section thereof, taken in the plane $x\ x$, Fig. 1.

Similar letters indicate corresponding parts.

My invention relates to improvements in refrigerator-buildings for storing kegs containing beer and other articles; and it consists in an ice-chamber which has a false bottom made in the form of a grate, in combination with one or more air-flues extending down through the roof of the building, and through the said ice-chamber, and communicating with the space below the said false bottom, so that when atmospheric air is allowed to enter said flue or flues, it circulates below said false bottom, and is thereby cooled, and in combination with one or more pipes or ducts which extend through the bottom proper of the ice-chamber to a storing-chamber situated beneath it, and which serve to conduct the air which is cooled in said ice-chamber to the storing-chamber. The bottom of the ice-chamber is inclined toward its middle portion, and is provided with a depression or trough at that point, so that the water resulting from the melting of the ice is collected in said trough, and it may thence be readily run off.

In the drawing, the letter A designates the ice-chamber of my refrigerator-building, and B is the storing-chamber, which is situated below said ice-chamber, and divided therefrom by the bottom of the latter, (marked C.) D is the false bottom of the ice-chamber, which false bottom is made in the form of a grate, as shown. Through the bottom C of the ice-chamber extend a series of pipes or ducts, G, which are preferably placed near the walls of the building.

E is the roof of the building, and F is an air-flue, which extends down through said roof, and through the ice-chamber A, terminating at a point somewhere below the grated false bottom D. This air-flue F communicates with the atmosphere at its top part through apertures $a$, and it can also be made to communicate with the upper part of the ice-chamber A through openings $b$.

The atmospheric air coming in through the flue F circulates in the space below the grated false bottom D, and if ice is placed upon this false bottom in the ice-chamber A, as illustrated, such air is rapidly cooled. From the lower part of the ice-chamber A the cold air passes through the pipes or ducts G to the storing-chamber B, and thereby the said chamber is adapted to refrigerating purposes.

The water resulting from the melting of the ice contained on the false bottom D in the ice-chamber is caught on the bottom C of said chamber; and said bottom C is inclined toward its middle part, and has a depression or trough, H, at that point, in which the water collects, and from which it can be drawn off by a stop-cock, $c$, or in any other suitable manner.

It may be remarked that one or more air-flues may be added to the flue F, and any number of pipes or ducts G may be used.

It will be noticed that by arranging the air-flue F so as to discharge under the false bottom D in the ice-chamber, the atmospheric air is brought in contact with the lower surface of the ice contained on the said false bottom, and the ice melts from the bottom upward. Moreover, by running said air-flue F down from the top of the building, pure air is obtained at all times, this arrangement being of especial advantage when the building is situated under ground.

What I claim as new, and desire to secure by Letters Patent, is—

The combination, in a refrigerator-building, of an ice-chamber, A, which has a grated false bottom, D, one or more air-flues, F, extending down through the roof of the building and through the ice-chamber, and terminating at its false bottom, a storing-chamber, B, and one or more pipes or ducts, G, serving to conduct the air which is cooled in the ice-chamber to said storing-chamber, substantially as described.

In testimony that I claim the foregoing I have hereunto set my hand and seal this 21st day of September, 1876.

CHARLES STOLL. [L. S.]

Witnesses:
W. HAUFF,
E. F. KASTENHUBER.